(12) United States Patent
Wu et al.

(10) Patent No.: US 12,296,989 B1
(45) Date of Patent: May 13, 2025

(54) SPACECRAFT THERMAL SYSTEMS AND METHODS

(71) Applicant: BAE Systems Space & Mission Systems Inc., Broomfield, CO (US)

(72) Inventors: Gordon Wu, Melbourne, FL (US); Derek Chan, Boulder, CO (US); Kevin Eugene Weed, Boulder, CO (US); Bryce Moore, Broomfield, CO (US); Kevin Hoopes, Erie, CO (US)

(73) Assignee: BAE Systems Space & Mission Systems Inc., Broomfield, CO (US)

( * ) Notice: Subject to any disclaimer, the term of this patent is extended or adjusted under 35 U.S.C. 154(b) by 406 days.

(21) Appl. No.: 17/676,956

(22) Filed: Feb. 22, 2022

Related U.S. Application Data (60) Provisional application No. 63/152,555, filed on Feb. 23, 2021, provisional application No. 63/248,840, filed on Sep. 27, 2021.

(51) Int. Cl.
| | |
|---|---|
| *B64G 1/50* | (2006.01) |
| *F28D 15/02* | (2006.01) |
| *F28D 21/00* | (2006.01) |

(52) U.S. Cl.
CPC ............ *B64G 1/506* (2013.01); *B64G 1/503* (2013.01); *F28D 15/0275* (2013.01)

(58) Field of Classification Search
CPC ............ F28D 15/0233; F28D 15/0241; F28D 15/0266; F28D 15/0275; F28D 2021/0021
See application file for complete search history.

(56) References Cited

U.S. PATENT DOCUMENTS

| | | | | |
|---|---|---|---|---|
| 4,162,701 | A * | 7/1979 | Ollendorf | G05D 23/24 165/274 |
| 5,069,274 | A | 12/1991 | Haslett et al. | |
| 5,351,746 | A * | 10/1994 | Mackey | B64G 1/503 165/41 |
| 5,682,943 | A * | 11/1997 | Yao | B64G 1/58 165/104.21 |
| 5,730,211 | A * | 3/1998 | Conway | B64G 1/506 165/274 |
| 5,735,489 | A * | 4/1998 | Drolen | B64G 1/50 244/171.8 |
| 5,806,803 | A | 9/1998 | Watts | |
| 5,862,462 | A * | 1/1999 | Tyner | H04B 7/18515 313/45 |
| 6,591,899 | B1 * | 7/2003 | Yee | B64G 1/506 165/104.14 |

(Continued)

*Primary Examiner* — Frantz F Jules
*Assistant Examiner* — Jason N Thompson
(74) *Attorney, Agent, or Firm* — Sheridan Ross P.C.

(57) ABSTRACT

Systems and methods for providing thermal systems having one or more radiators that each incorporate one or more heat pipe matrices are provided. Each heat pipe matrix includes at least one spreader heat pipe element and a plurality of lateral heat pipe elements. The lateral heat pipe elements can extend in a direction that is generally transverse to a direction in which the spreader heat pipe element extends. Each lateral heat pipe element includes a portion that is thermally coupled and parallel to a portion of at least one spreader heat pipe element. Multiple heat pipe matrices can be thermally coupled to one another by jumper heat pipes to form heat pipe networks.

17 Claims, 10 Drawing Sheets

(56) References Cited

U.S. PATENT DOCUMENTS

| | | | |
|---|---|---|---|
| 6,776,220 B1 * | 8/2004 | Low | B64G 1/50 |
| | | | 165/41 |
| 7,118,076 B2 | 10/2006 | Tjiptahardja et al. | |
| 7,513,462 B1 | 4/2009 | McKinnon et al. | |
| 8,240,612 B2 | 8/2012 | Jondeau et al. | |
| 8,820,684 B2 | 9/2014 | McKinnon et al. | |
| 8,967,547 B2 | 3/2015 | Wong et al. | |
| 10,018,426 B2 | 7/2018 | Aston et al. | |
| 2002/0139512 A1 | 10/2002 | Low et al. | |
| 2003/0051857 A1 * | 3/2003 | Cluzet | F28D 15/043 |
| | | | 165/41 |
| 2016/0305714 A1 | 10/2016 | Smith et al. | |

* cited by examiner

SPACECRAFT THERMAL SYSTEMS AND METHODS

CROSS-REFERENCE TO RELATED APPLICATIONS

This application claims the benefit of U.S. Provisional Patent Application Ser. No. 63/152,555, filed Feb. 23, 2021, and of U.S. Provisional Patent Application Ser. No. 63/248,840, filed Sep. 27, 2021, the entire disclosures of each of which are hereby incorporated herein by reference.

FIELD

Spacecraft thermal systems and methods having radiator panels incorporating heat pipes are provided.

BACKGROUND

In space applications, a fundamental method of removing heat from dissipating units is through radiation using a thermal radiator. This radiator is typically composed of a thermally conductive material to help spread the heat across the radiator surface. Heat pipes, having a higher thermal conductivity, are more efficient than using conductive material at transporting heat, providing mass benefits. Utilizing heat pipes with radiators combines the ability to spread heat efficiently across a large surface. Having a heat pipe network allows for flexible unit mounting anywhere on the panel.

Satellites in geosynchronous Earth orbit (GEO) commonly employ North/South radiator panels with embedded heat pipe networks. In order to take advantage of additional thermal capability on the shade side panel, jumper heat pipes are used to transfer heat from the sun side panel. A well designed thermal system incorporating jumper heat pipes can increase spacecraft thermal capacity by a meaningful amount, while incurring a relatively small increase in thermal mass. This increased efficiency reduces radiator sizing, volume, mass and cost, which are all important considerations, particularly in connection with spacecraft. However, previous heat pipe configurations have suffered from various deficiencies. For example, they can be complex, labor intensive to assemble, and relatively inefficient.

Accordingly, it would be desirable to provide a thermal system incorporating heat pipes that was relatively easy to assemble, highly efficient, and relatively low mass.

SUMMARY

Thermal systems and methods having a heat pipe network are provided. The heat pipe network includes at least one heat pipe matrix that is incorporated into or thermally coupled to a radiator element or panel. Each heat pipe matrix in a heat pipe network in accordance with embodiments of the present disclosure includes a plurality of lateral heat pipes and one or more spreader heat pipes. In accordance with further embodiments of the present disclosure, a heat pipe network can include multiple heat pipe matrices thermally coupled to one another by jumper heat pipes.

In accordance with embodiments of the present disclosure, the plurality of lateral heat pipes in a heat pipe matrix include individual lateral heat pipe elements having one or more end sections or portions that are in thermal contact with one or more of spreader heat pipe elements. The lateral heat pipe elements can have a U-shaped configuration, with first and second end portions that extend parallel to and that are in thermal contact with first and second spreader heat pipe elements respectively. Alternatively, the lateral heat pipe elements can have an L-shaped configuration, with one end portion that extends parallel to and that is in thermal contact with one of the spreader heat pipe elements. Adjacent L-shaped lateral heat pipe elements can alternately be attached to the first and second spreader heat pipe elements. In such embodiments, the spreader heat pipe elements can be straight or U-shaped.

In accordance with further embodiments of the present disclosure, a heat pipe matrix is provided in which the lateral heat pipe elements are straight, and are thermally interconnected to one or more serpentine type spreader heat pipe elements. The serpentine type spreader heat pipe elements can include thermal contact segments that each extend parallel to a portion of a lateral heat pipe element. The thermal contact segments are connected to one another by bend portions. A serpentine type spreader heat pipe element can include thermal contact segments that are in contact with each lateral heat pipe element. Alternatively, a serpentine type spreader heat pipe element can include thermal contact segments that form thermal contact areas with a subset of the lateral heat pipe elements. For instance, a serpentine type spreader heat pipe element can include thermal contact segments that form thermal contact areas with every other lateral heat pipe element within the matrix.

The thermal system in accordance with embodiments of the present disclosure can incorporate multiple heat pipe matrices as disclosed herein. Each matrix can be associated with the same or different radiator elements. Moreover, different heat pipe matrices and associated radiator elements can be mounted on different exterior surfaces of a spacecraft or other platform. In such embodiments, jumper heat pipes can extend between the different heat pipe matrices, thermally joining them to one another. For example, a jumper heat pipe can include a first section that extends parallel to a section of a spreader heat pipe included in a first heat pipe matrix, a connecting section that extends from the first heat pipe matrix to a second heat pipe matrix, and a second section that extends parallel to a section of a spreader heat pipe element included in the second heat pipe matrix. In accordance with further embodiments of the present disclosure, a jumper heat pipe can include a section that extends parallel to a portion of a lateral heat pipe of a first heat pipe matrix, a connecting section that extends from the first heat pipe matrix to a second heat pipe matrix, and a second section that extends parallel to a portion of a lateral heat pipe of the second heat pipe matrix. Moreover, jumper heat pipes of the different types can be utilized within the same thermal system. In addition, different spreader heat pipe and/or lateral heat pipe configurations can be included within the same heat pipe matrix or within a heat pipe network having multiple heat pipe matrices.

Methods in accordance with embodiments of the present disclosure include configuring thermal systems that include one or more radiators, each incorporating one or more heat pipe matrices operating independently, or connected to one another. The methods include configuring each heat pipe matrix such that included elements each have sections that extend parallel to one another, forming relatively large thermal contact areas. In addition, jumper heat pipes having portions that extend parallel to elements of different heat pipe matrices can be provided, to thermally connects the different heat pipe matrices.

Additional features and advantages of embodiments of the present disclosure will become more readily apparent from the following description, particularly when considered together with the accompanying drawings.

DETAILED DESCRIPTION

Figure 1:
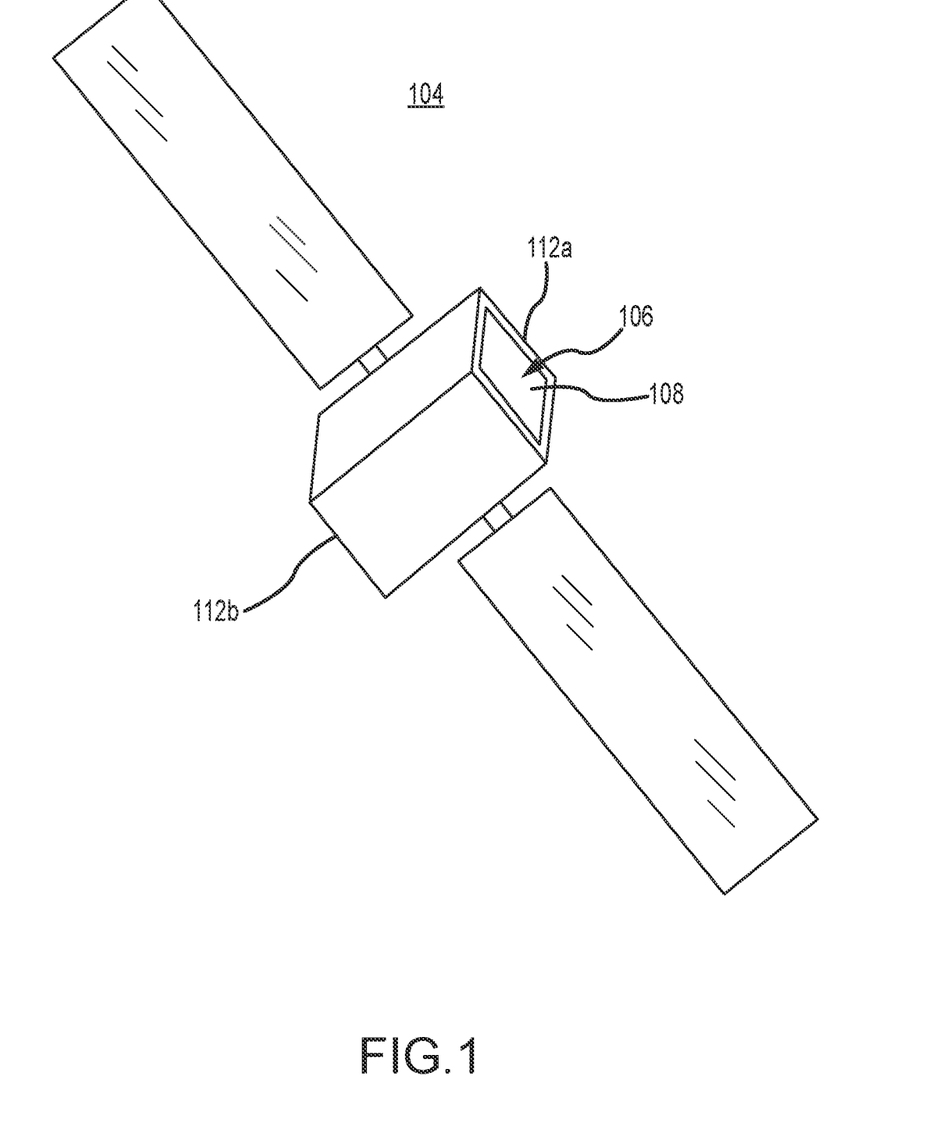
FIG. 1 depicts a spacecraft and associated radiator elements in accordance with embodiments of the present disclosure.

FIG. 1 depicts a platform 104 having a thermal system 106 incorporating one or more radiator elements or panels 108. Each of the radiator elements 108 can incorporate or include one or more heat pipe matrices as described herein. In the illustrated example, the platform 104 includes a first radiator element 108 mounted to a first end or surface 112a of the platform 104, and a second radiator element (not visible in the figure) mounted to a second end or surface 112b of the platform 104. As an example, the platform 104 can be a satellite configured for operation in a geosynchronous orbit, with one or more radiator elements 108 on each of the north and south facing ends of the platform 104. However, the platform 104 is not limited to a satellite or spacecraft, and can include any type of vehicle or stationary structure. Although in the illustrated example, radiator elements 108 are disposed on opposite surfaces of the platform 104, in other embodiments of the present disclosure, radiator elements 108 and associated heat pipe matrices can be disposed on the same plane or surface, or on planes or surfaces that are not necessarily on opposite ends of a vehicle or structure.

In accordance with embodiments of the present disclosure, and as discussed in greater detail elsewhere herein, the radiator elements 108 each incorporate one or more heat pipe matrices to spread heat across an associated radiator element 108 and thereby promote the transfer of heat. Moreover, in accordance with at least some embodiments of the present disclosure, the heat pipe matrices associated with the radiator elements 108 can be thermally coupled to one another, as also described herein.

Figure 2:
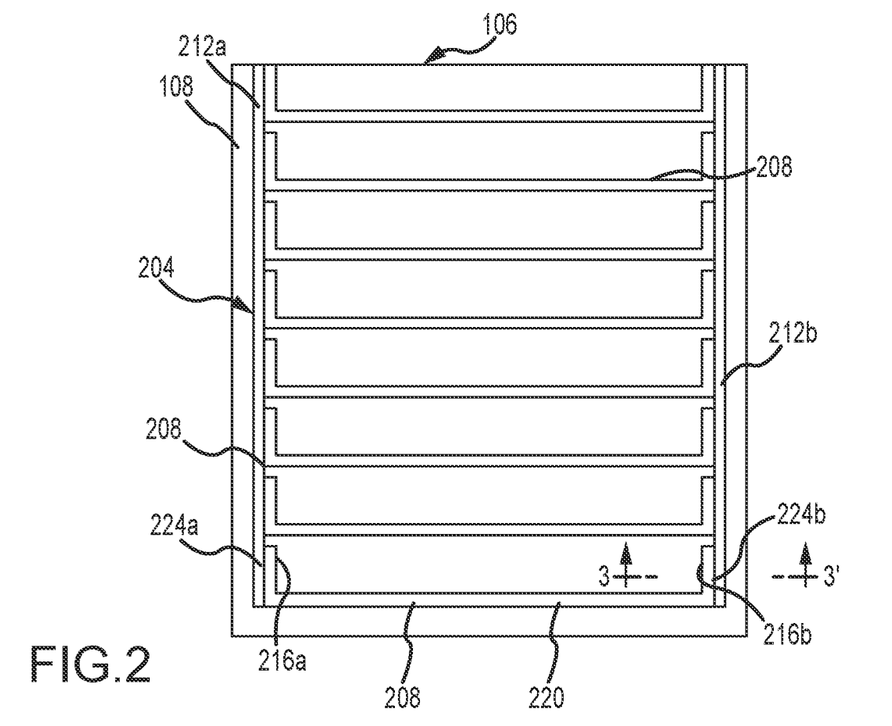
FIG. 2 depicts a radiator element and associated heat pipe matrix in accordance with embodiments of the present disclosure.

FIG. 2 depicts a thermal system 106 including a radiator element 108 incorporating a heat pipe matrix 204 in accordance with at least some embodiments of the present disclosure. A top plate or faceplate and core of the radiator element 108 are not shown in the figure, to better illustrate the components of the heat pipe matrix 204. As shown, the heat pipe matrix 204 extends over an area corresponding to some or all of an area of the associated radiator element 108. The heat pipe matrix 204 can include a plurality of lateral heat pipe elements 208 and a plurality of spreader heat pipe elements 212. In general, the heat pipe elements 208 and 212 function to spread heat across the surface of an associated radiator element 108. In accordance with further embodiments, heat can be transferred between different heat pipe matrices 204 and thus between different radiator elements 108. As can be appreciated by one of skill in the art after consideration of the present disclosure, each heat pipe element 208 and 212 is generally configured as a sealed chamber containing a heat transfer medium. As also can be appreciated by one of skill in the art after consideration of the present disclosure, channels, wicking members, or other features can be incorporated into the interior of each heat pipe, to promote the flow of the heat transfer medium along the interior surface of the heat pipe.

In the example of FIG. 2, each lateral heat pipe element 208 is generally U-shaped, and extends between first 212a and second 212b spreader heat pipe elements. In addition, each lateral heat pipe element 208 includes first 216a and second 216b end segments connected to one another by a center portion 220. The first end segment 216a is thermally coupled and generally parallel to a portion of the first spreader heat pipe element 212a along a first thermal contact area 224a, while the second end segment 216b is thermally coupled and generally parallel to a portion of the second spreader heat pipe element 212b along a second thermal contact area 224b. Moreover, where the lateral heat pipe element 208 center sections 220 are all parallel to one another, the angle of a respective end segment 216 to the center section 220 of each lateral heat pipe element 208 is the same. In accordance with embodiments of the present disclosure, the thermal contact area 224 between any one lateral heat pipe element 208 end segment 216 and an associated spreader heat pipe element 212 extends for the entire length of the end segment 216 and a portion of a respective spreader heat pipe element 212. In addition, the different lateral heat pipe elements 208 can be arrayed such that their respective center sections 220 are all parallel to one another. Where the spreader heat pipe elements 212 are parallel to one another, the end segments 216 of a lateral heat pipe element 208 are parallel to one another. Accordingly, the end segments 216 can be disposed at an angle, in this example 90°, relative to the center section 220. In accordance with at least some embodiments of the present disclosure, an end segment 216 may have a length that is at least most of a spacing distance (i.e. more than half the spacing distance) between the center sections 220 of adjacent lateral heat pipe elements 208. In accordance with other embodiments, an end segment 216 may have a length that is greater than 80% of a spacing distance between the center sections 212 of adjacent lateral heat pipe elements 208. As can be appreciated by one of skill in the art after consideration of the present disclosure, the thermal contact areas 224 of the disclosed heat pipe matrices 204, formed from portions of the lateral 208 and spreader 212 heat pipe elements that are disposed in parallel to one another are much larger than a design in which the thermal contact areas are formed where lateral heat pipe elements cross or intersect spreader heat pipe elements.

Figure 3A:
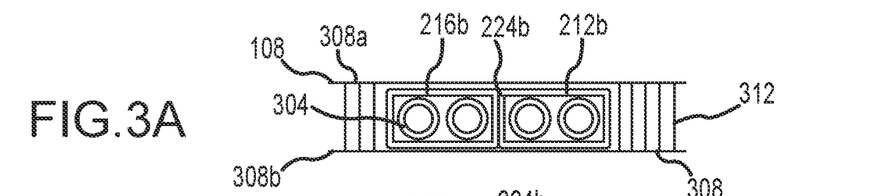
FIGS. 3A-3C depict example interfaces between lateral heat pipe elements and spreader heat pipe elements in heat pipe matrices in accordance with embodiments of the present disclosure.
Figure 3B:
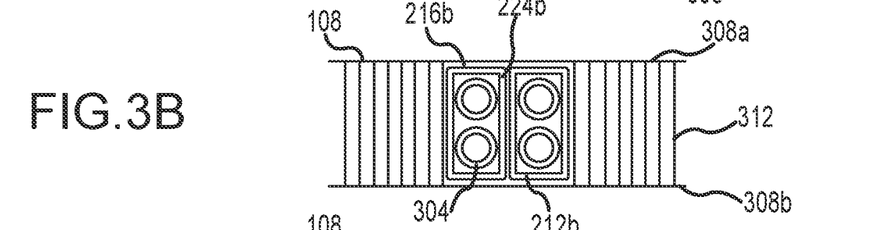
Figure 3C:
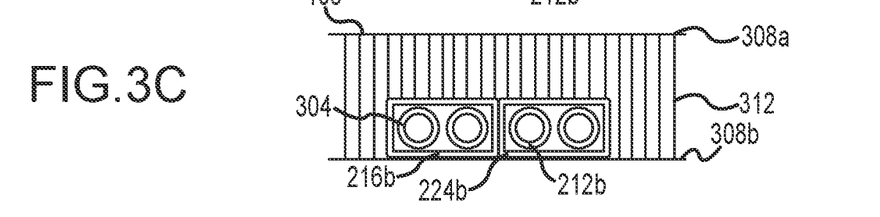

FIGS. 3A-3C depict details of example thermal interfaces or contact areas 224 between an end segment 216 of a lateral heat pipe element 208 and a spreader heat pipe element 212 in accordance with embodiments of the present disclosure in a cross-section taken along section line 3-3' of the thermal system 106 illustrated in FIG. 2. More particularly, each heat pipe element 208 and 212 can have a generally rectangular external form in cross-section, with one or more bores 304 formed therein. For instance, as shown in the figures, each heat pipe element 208 and 212 can include two bores 304. Each bore 304 is a sealed chamber containing a heat transfer medium. As shown in the figures, the lateral heat pipe elements 208 and spreader heat pipe elements 212 can be disposed between opposing first 308a and second 308b faces of the associated radiator panel 108. A honeycomb core 312 can be sandwiched between the faceplates 308, and can function to thermally and structurally bridge the heat pipe elements 208 and 212 to the faceplates 308. At the thermal interface or contact area 224, a portion of a lateral heat pipe element 208 and a spreader heat pipe element 212 can be in contact with one another directly, and/or through a conductive adhesive, welding, or the like. Although the illustrated variants feature heat pipe elements 202 and 212 that in cross-section have the same or similar sizes and configurations, other configurations are possible. For instance, the heat pipe elements 208 and 212 can have any number of bores 304, can have differing numbers of bores 304, and can have different exterior surface shapes or sizes.

Figure 4:
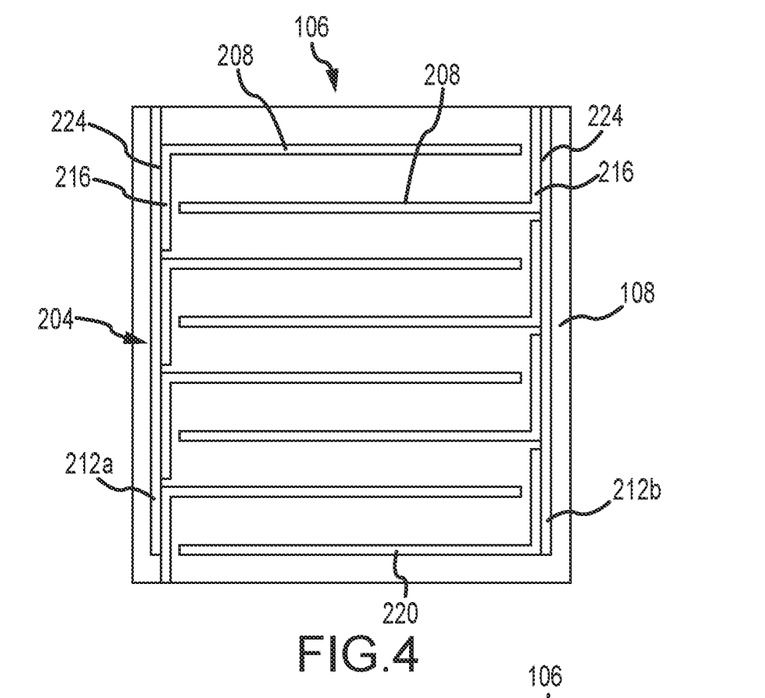
FIG. 4 depicts a heat pipe matrix in accordance with other embodiments of the present disclosure.

FIG. 4 depicts a thermal system 106 with a radiator element 108 incorporating a heat pipe matrix 204 in accordance with other embodiments of the present disclosure. This example includes L-shaped lateral heat pipe elements 208. Each lateral heat pipe element 208 includes one end segment 216 that is joined and generally parallel to a portion of one of two spreader heat pipe elements 212a and 212b along a thermal contact area 224, and a center or laterally extending section 220.

Figure 5:
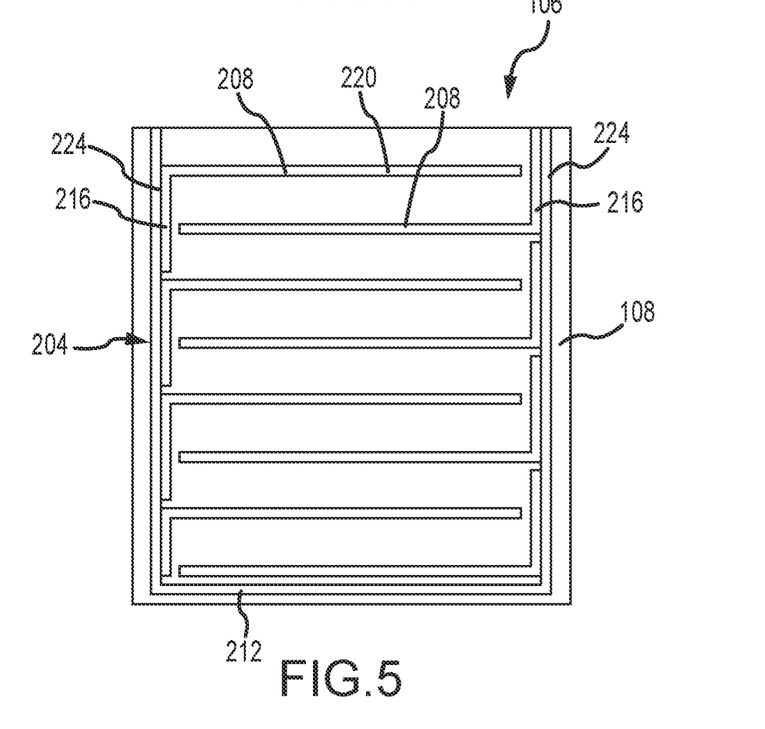
FIG. 5 depicts a heat pipe matrix in accordance with other embodiments of the present disclosure.

FIG. 5 depicts a thermal system 106 with a radiator element 108 incorporating a heat pipe matrix 204 in accordance with still other embodiments of the present disclosure. This example includes L-shaped lateral heat pipe elements 208 that each have one end segment 216 and a center section 220. In this embodiment, the end segment 216 of each lateral heat pipe element 208 is generally parallel to one side portion of a unitary U-shaped spreader heat pipe element 212 along a thermal contact area 224.

In the example configurations depicted in FIGS. 4 and 5, the side of the heat pipe matrix 204 on which an end segment 216 is disposed alternates between adjacent lateral heat pipe elements 208, thereby allowing the end segments 216 to extend for a distance that approaches twice the spacing distance between adjacent lateral heat pipe element 208 center sections 220. In particular, the thermal contact area 224 of the one end segment 216 of each L-shaped lateral heat pipe element 208 can be equal or about equal to the thermal contact areas 224a and 224b of an otherwise equivalent heat pipe matrix 204 incorporating U-shaped lateral heat pipe elements 208.

A heat pipe matrix 204 thermally coupled to a spreader heat pipe element 212 along a single thermal contact area 224, as illustrated in FIGS. 4 and 5, enables a heat pipe matrix 204 to be assembled using lower tolerances than configurations having lateral heat pipe elements 208 that are thermally coupled to spreader heat pipe elements 212 through two or more thermal contact areas 224. For example, an angle between an end segment 216 and a center section 220 of any one lateral heat pipe element need not be equal to the angle between the end segment 216 and the center section 220 of any other lateral heat pipe element 212. In addition, the center sections 220 of adjacent lateral heat pipe elements 208 need not be parallel to one another. Moreover, as the thermal contact area 224 between a lateral heat pipe element 208 and a thermally coupled spreader heat pipe element 212 extends for the length of the end segment 216, the thermal contact area 224 between the lateral heat pipe element 208 and the connected spreader heat pipe element 212 is relatively large.

Figure 6A:
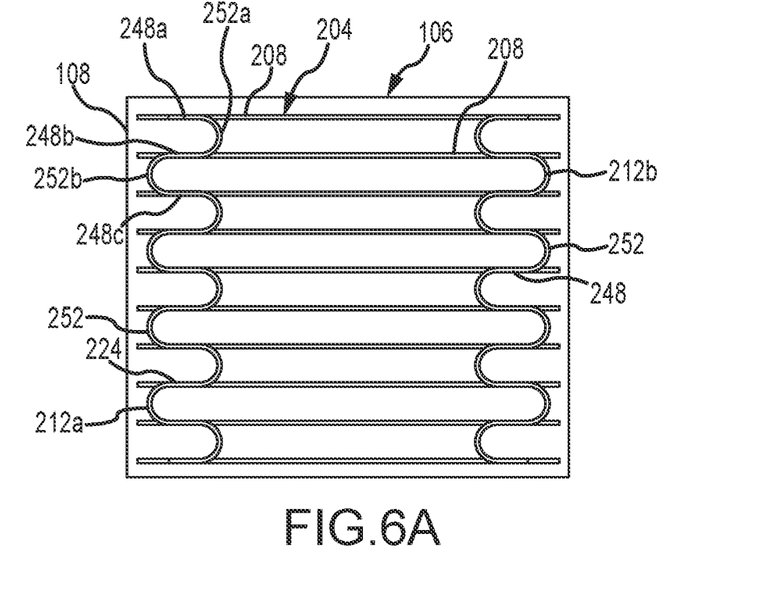
FIGS. 6A and 6B depict heat pipe matrices in accordance with other embodiments of the present disclosure, and in particular depict heat pipe matrices having serpentine spreader heat pipe elements.
Figure 6B:
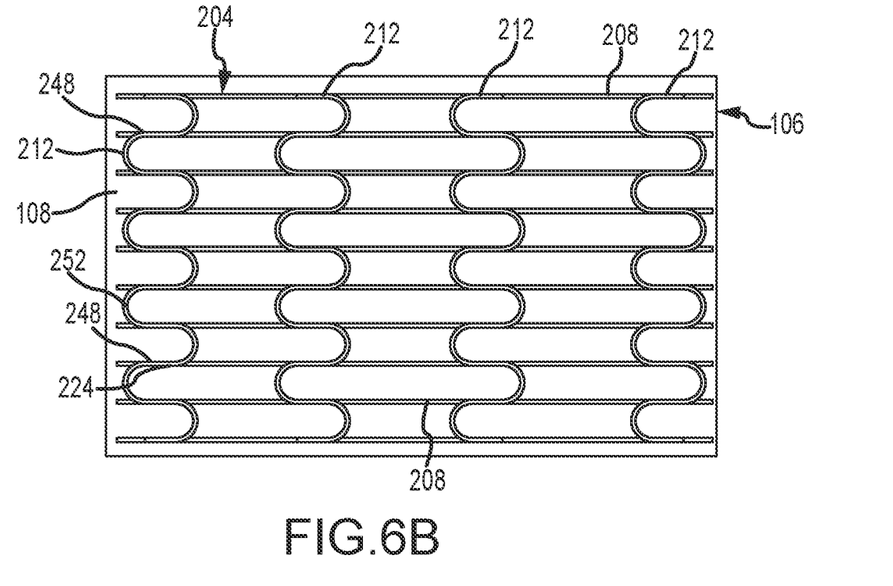

FIGS. 6A and 6B depict thermal systems 106 including a radiator element 108 incorporating a heat pipe matrix 204 in accordance with still further embodiments of the present disclosure. Such embodiments share various characteristics with other disclosed embodiments. Accordingly, as shown, the heat pipe matrix 204 extends over an area corresponding to some or all of an area of the associated radiator element 108. Moreover, as in other embodiments, in a completed thermal system 106 the heat pipe matrix 204 can be disposed between the faceplates 308 of the radiator element 108 in which the heat pipe matrix 204 is incorporated. The heat pipe matrix 204 includes a plurality of lateral heat pipe elements 208 and one or more spreader heat pipe elements 212. In general, the heat pipe elements 208 and 212 function to spread heat across the surface of an associated radiator element 108. In accordance with further embodiments, heat can be transferred between different heat pipe matrices 204 and thus between different radiator elements 108. As can be appreciated by one of skill in the art after consideration of the present disclosure, each heat pipe element 208 and 212 is generally configured as a sealed chamber containing a heat transfer medium. As also can be appreciated by one of skill in the art after consideration of the present disclosure, channels, wicking members, or other features can be incorporated into the interior of each heat pipe, to promote the flow of the heat transfer medium along the interior surface of the heat pipe.

In the examples of FIGS. 6A and 6B, each lateral heat pipe element 208 is straight. Accordingly, the lateral heat pipe elements 208 in such embodiments are relatively easy and inexpensive to produce. As shown in the figure, the lateral heat pipe elements 208 can be disposed in the matrix 204 such that they are parallel to one another. Portions of each of the one or more spreader heat pipe elements 212 in this example embodiment are in thermal contact with a portion of each lateral heat pipe element 208. Moreover, the spreader heat pipe elements 212 are provided as serpentine or sinuous elements, with thermal contact segments or portions 248 that extend parallel to thermally coupled portions of the lateral heat pipe elements 208 for at least a portion of the length of the lateral heat pipe elements 208, forming thermal contact areas 224 having a length equal to a length of the thermal contact segment 248. Each of the thermal contact segments 248 are joined to one another by radiused or bent segments or portions 252. Moreover, the direction of the bend 252 alternates, such that the bend 252 is open in a first direction between a first thermal contact segment 248 and a second thermal contact segment 248, and is open in a second direction between the second thermal contact segment 248 and a third thermal contact segment 248. For example, in the example of FIG. 6A, the first spreader heat pipe element 212a includes a first bend 252a between a first thermal contact segment 248a and a second thermal contact segment 248b, where the first bend 252a is open towards the left in the figure, and a second bend 252b between the second thermal contact segment 252b and a third thermal contact segment 248c, where the second bend 252b is open towards the right in the figure.

A heat pipe matrix 204 with serpentine spreader heat pipe elements 212 enables relatively large thermal contact areas 224 between the spreader heat pipe elements 212 and the lateral heat pipe elements 208. In particular, the length of the thermal contact areas 224 is not limited by the spacing between adjacent lateral heat pipe elements 208. Moreover, a length of the thermal contact segment 248 of a serpentine type spreader heat pipe element 212 in contact with a lateral heat pipe element 208, and thus a length of the thermal contact area 224, can be arbitrarily long. For example, a serpentine type spreader heat pipe element 212 can have a thermal contact segment 248 that is as long as the entire length of a lateral heat pipe element 208. As illustrated in FIG. 6B, any number of serpentine heat spreader elements 212 can be included in a matrix 204. In addition, a lateral spacing between adjacent heat spreader elements 212 can be varied as desired.

Figure 7:
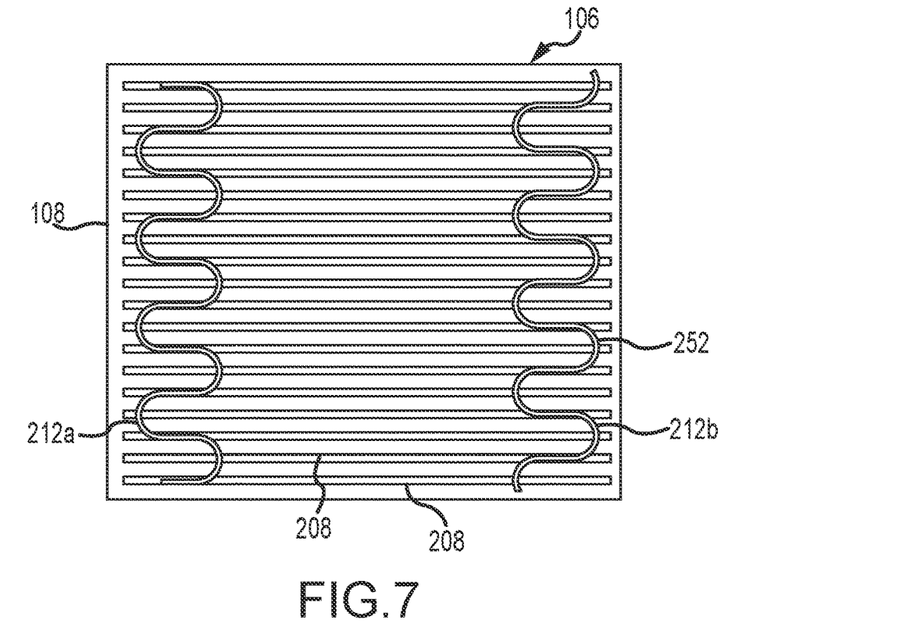
FIG. 7 depicts a heat pipe matrix in accordance with other embodiments of the present disclosure, and in particular depicts a heat pipe matrix having staggered serpentine spreader heat pipe elements.

As can be appreciated by one of skill in the art, using conventional heat pipe extrusions and forming techniques, the radius of bends in heat pipes must generally be greater than some minimum amount, in order to avoid damaging the heat pipe element extrusions. This relatively large radius of curvature can in turn limit the minimum spacing between lateral heat pipe elements 208. In order to provide a reduced spacing between adjacent lateral heat pipe elements 208, serpentine spreader heat pipe elements 212 can be staggered. In particular, as illustrated in FIG. 7, a first serpentine spreader heat pipe element 212a can be provided for thermally connecting a set including odd lateral heat pipe elements 208, and a second serpentine heat pipe element 212b can be provided for thermally connecting a set including even lateral heat pipe elements 208, where the lateral heat pipe elements 212 in the first set are interleaved with the lateral heat pipe elements 212 in the second set. This enables a reduction in the spacing between adjacent lateral heat pipe elements 208 by up to one-half the spacing otherwise available for a given serpentine heat pipe element 212 bend 252 radius. In accordance with further embodiments of the present disclosure, additional staggered serpentine type spreader heat pipe elements 212 can be included in a heat pipe matrix 204. For example, a third staggered serpentine type spreader heat pipe element 212 can be thermally connected to a third set of lateral heat pipe elements, or to one of the first and second sets of lateral heat pipe elements.

Figure 8:
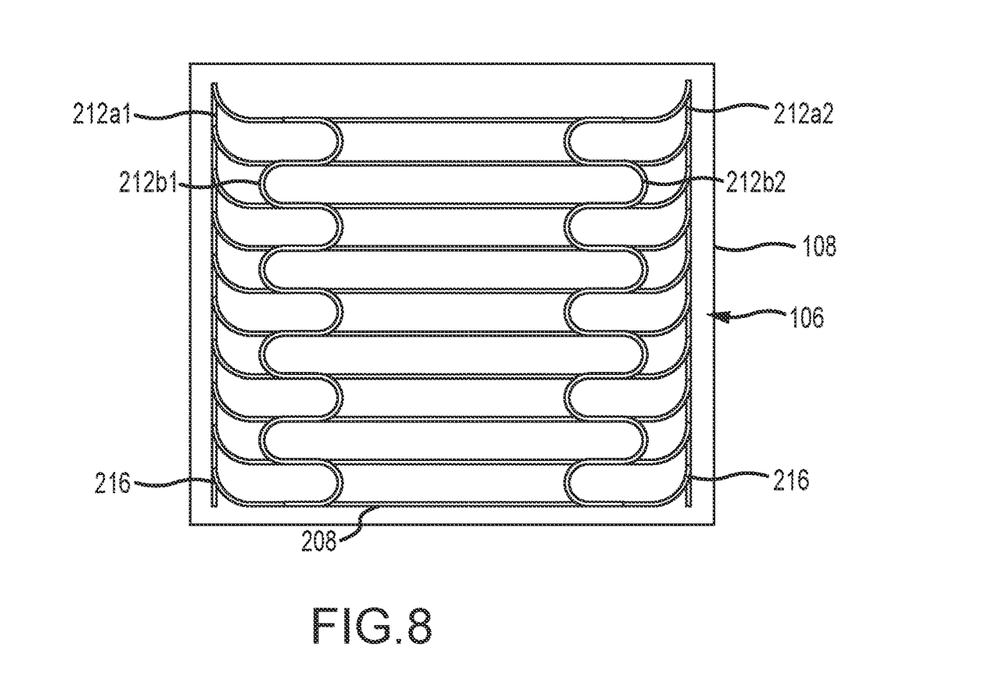
FIG. 8 depicts a heat pipe matrix in accordance with other embodiments of the present disclosure, and in particular depicts a heat pipe matrix having different types of spreader heat pipe elements.

In accordance with still other embodiments of the present disclosure, a single heat pipe matrix 204 can include different spreader heat pipe element 212 configurations. For instance, as shown in FIG. 8, a heat pipe matrix can include U-shaped lateral heat pipe elements 208, with end segments 216 in thermal contact with straight spreader heat pipe elements 212a, and can further include one or more serpentine spreader heat pipe elements 212b. Accordingly, thermal contact areas 224 can be formed along one or more end segments 216 and along one or more portions of the center section 220 of one or more lateral heat pipe elements 208.

Embodiments of the present disclosure, such as those depicted in FIGS. 6-8 that incorporate serpentine type spreader heat pipe elements 212 can be configured as dual layer structures, with the lateral heat pipes 208 in a first layer, and the spreader heat pipe elements 212 in a second layer. Moreover, as in other embodiments, the heat pipe elements 208 and 212 can be formed from extrusions having a selected number of bores. For example, one or both of the lateral heat pipe elements 208 and the spreader heat pipe elements 212 can be formed from single or dual bore heat pipe extrusions.

Figures 9, 10A:
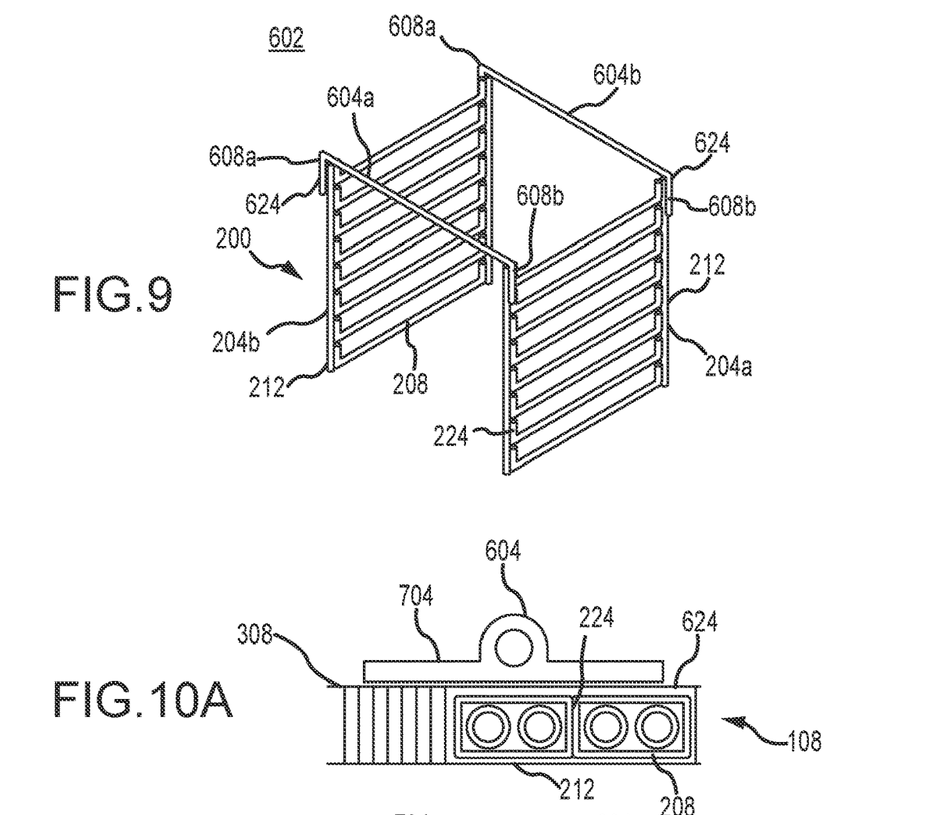
FIG. 9 depicts heat pipe matrices thermally coupled by jumper heat pipes in accordance with embodiments of the present disclosure.
FIGS. 10A-10C depict example interfaces between jumper heat pipes and heat pipe matrices in accordance with embodiments of the present disclosure.

FIG. 9 depicts a heat pipe network 602 included in a thermal system 106 that has multiple heat pipe matrices 204 thermally coupled to one another by jumper heat pipes 604 in accordance with embodiments of the present disclosure. In the illustrated heat pipe network 602, a first heat pipe matrix 204a is joined to a second heat pipe matrix 204b by first 604a and second 604b jumper heat pipes. Each jumper heat pipe 604 can include first 608a and second 608b end segments, and a transverse or center section 612. The first 608a and second 608b end segments are thermally coupled and are generally parallel to portions of respective spreader heat pipe elements 212 of the heat pipe matrices 204 along thermal contact areas 624 that have a length equal to the length of the end segments 608. Moreover, the end segments 608 extend parallel to the spreader heat pipe elements 212 to which they are joined, providing a relatively large contact area between the jumper heat pipes 604 and the spreader heat pipe elements 212. As shown, the different heat pipe matrices 204a and 204b can be disposed on different planes. For example, the first heat pipe matrix 204a can be disposed on a north facing plane of a spacecraft 104 in a geosynchronous orbit, while the second heat pipe matrix 204b can be disposed on a south facing plane of the spacecraft 104. This allows, for example, heat to be transferred from a radiator element 108 of the thermal system 106 on a side of a spacecraft 104 that is exposed to the sun to a radiator element 108 in the shade. In accordance with still other embodiments of the present disclosure, the different heat pipe matrices 204 can share spreader heat pipe elements 212. In particular, to U-shaped spreader heat pipe elements 212 can extend along and between a side of each heat pipe matrix 204. Moreover, such a configuration can also include jumper heat pipes 604 that extend between the different heat pipe matrices 204.

Figure 10B:
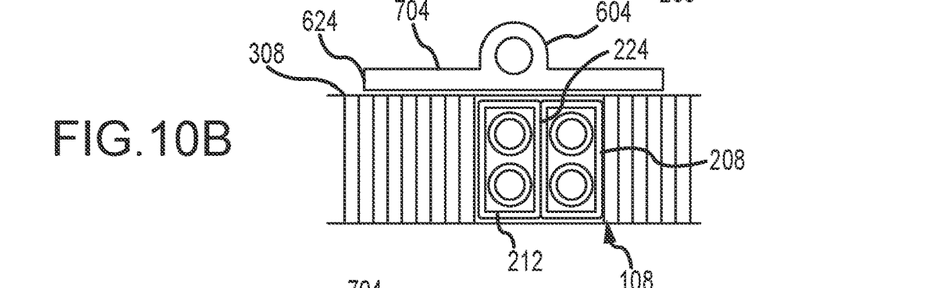
Figure 10C:
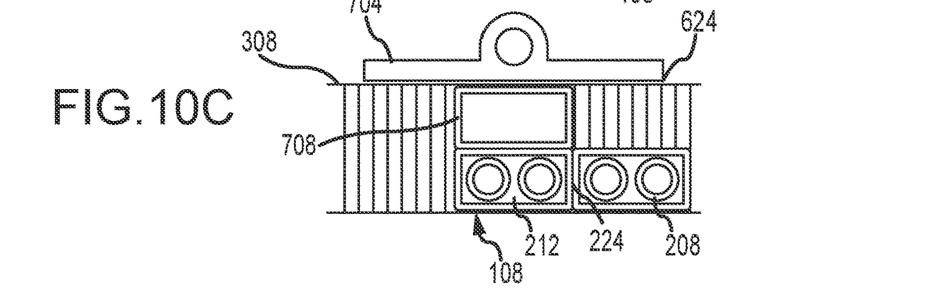

FIGS. 10A-10C depict example interfaces between jumper heat pipes 604 and heat pipe matrices 204 within thermal contact areas 624 in accordance with embodiments of the present disclosure. In particular, a jumper heat pipe 604 can be associated with a flange 704 that thermally couples the jumper heat pipe 604 to a faceplate 308 of a radiator element 108 and a spreader heat pipe element 212 disposed within the radiator element 108. In accordance with at least some embodiments of the present disclosure, a thermal conductor 708, for example in the form of a metal block, can be disposed between a jumper heat pipe 604 and a spreader heat pipe element 212, as shown in FIG. 10C.

Figure 11:
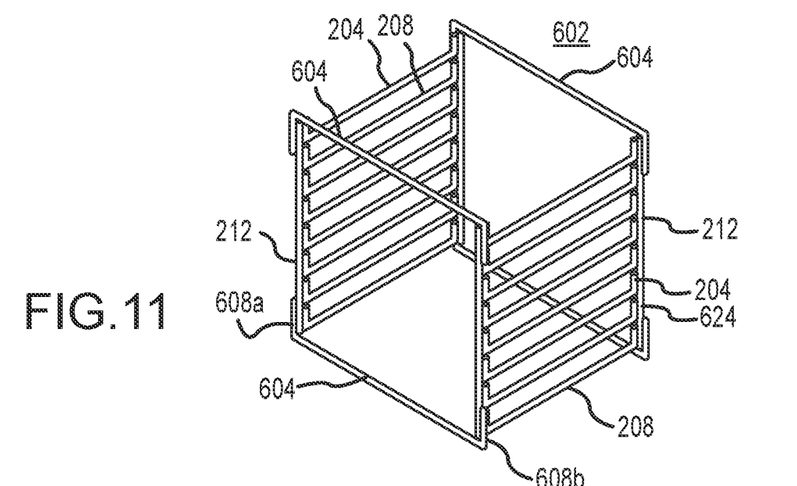
FIG. 11 depicts heat pipe matrices thermally coupled by jumper heat pipes in accordance with other embodiments of the present disclosure.
Figure 12:
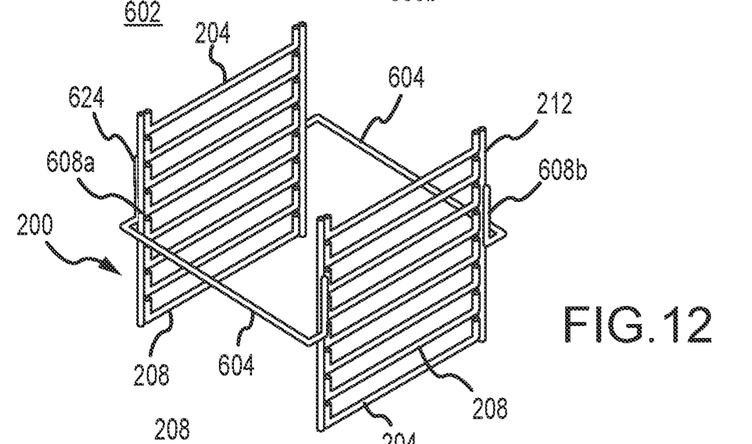
FIG. 12 depicts heat pipe matrices thermally coupled by jumper heat pipes in accordance with other embodiments of the present disclosure.
Figure 13:
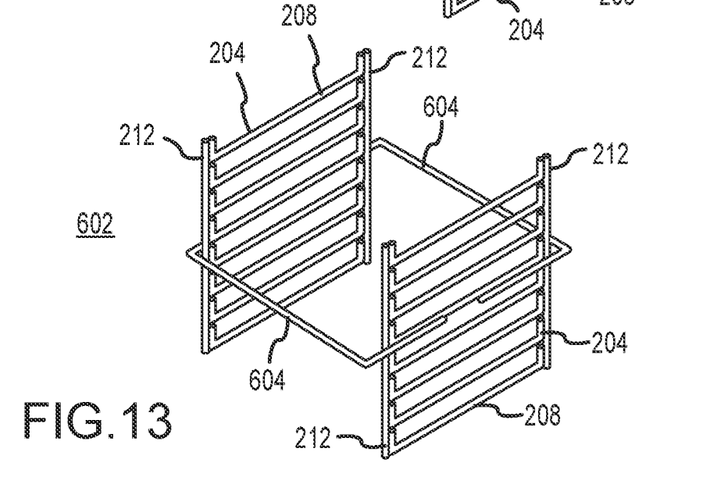
FIG. 13 depicts heat pipe matrices thermally coupled by a jumper heat pipe in accordance with embodiments of the present disclosure.

FIG. 11 depicts a heat pipe network 602 having two heat pipe matrices 204 joined by two pairs of jumper heat pipes 604. As in other embodiments featuring multiple heat pipe matrices 204, the different heat pipe matrices 204, and the radiators incorporating those heat pipe matrices 204 (not shown in the figure) can be disposed on different surfaces of a platform 104. FIG. 12 depicts a heat pipe network 602 in which heat pipe matrices 204 are thermally coupled by jumper heat pipes 604 in accordance with other embodiments of the present disclosure. In particular, the jumper heat pipes 604 include end portions that extend parallel to central portions of the spreader heat pipe elements 212. FIG. 13 depicts a heat pipe network 602 in which heat pipe matrices 204 are thermally coupled by jumper heat pipes 604 in accordance with other embodiments of the present disclosure. In particular, the jumper heat pipes 604 include end portions that extend parallel to central portions of the lateral heat pipe elements 208. As can be appreciated by one of skill in the art after consideration of the present disclosure, the various different types of jumper heat pipes 604 can be used in combination. For instance, one or two pairs of jumper heat pipes 604 extending from end portions of spreader heat pipe elements 212, as illustrated in FIGS. 9 and 11, can be combined with the jumper heat pipes 604 extending from a central portion of a spreader heat pipe element 212, as illustrated in FIGS. 12 and 13. In accordance with still other embodiments of the present disclosure, a jumper heat pipe 604 can interface with a lateral heat pipe element 208 as an alternative or in addition to interfacing with a spreader heat pipe element 212. Moreover, where a heat pipe matrix 204 having one or more serpentine heat spreader elements 212 is thermally connected to another heat pipe matrix 204, a jumper heat pipe 604 can extend in a direction parallel to the lateral heat pipe element 208 and/or parallel to the thermal contact segment 248 of a serpentine heat spreader element 212.

Figure 14:
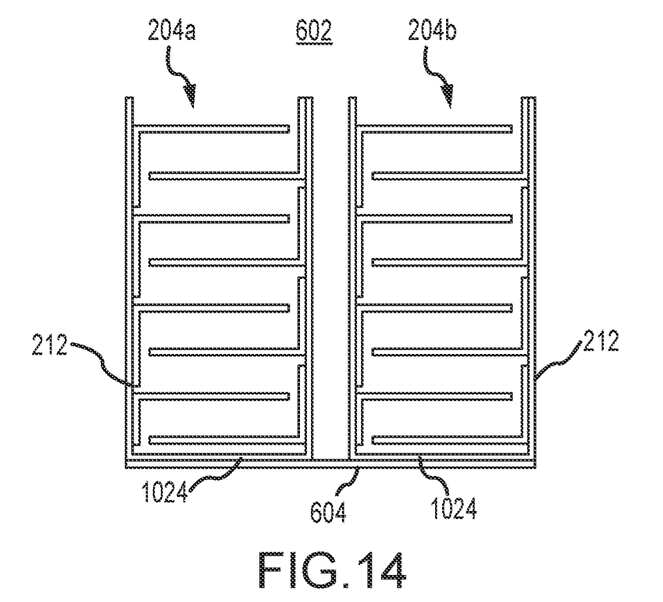
FIG. 14 depicts heat pipe matrices thermally coupled by a jumper heat pipe in accordance with embodiments of the present disclosure.

FIG. 14 depicts a heat pipe network 602 having multiple heat pipe matrices 204 thermally coupled to one another by a jumper heat pipe 604 in accordance with still other embodiments of the present disclosure. The jumper heat pipe 604 is thermally coupled to the lateral portions of U-shaped spreader heat pipe elements 212 of each heat pipe matrix 204 along thermal contact areas 1024 that extend across the entire width of each heat pipe matrix 204. In this example first 204a and second 204b heat pipe matrices are disposed on a common plane. For instance, the heat pipe matrices 204 may be incorporated into a common radiator element 108.

Figure 15:
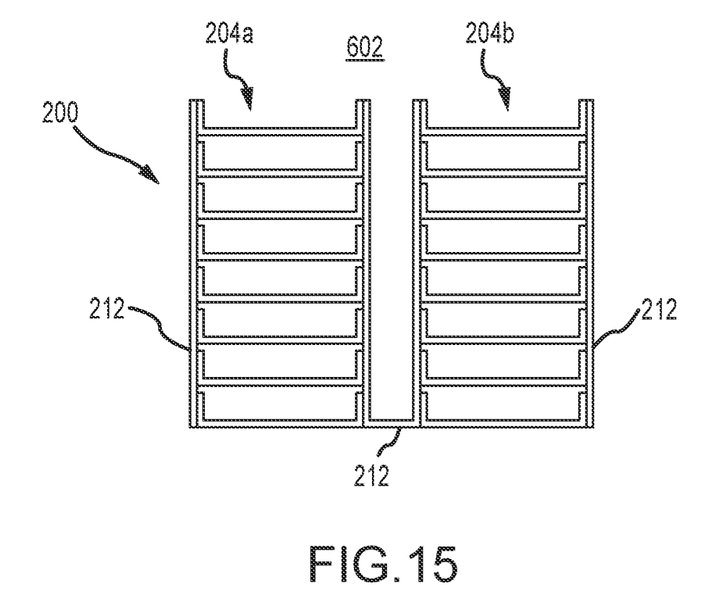
FIG. 15 depicts heat pipe matrices thermally coupled by a shared spreader heat pipe in accordance with embodiments of the present disclosure.

FIG. 15 depicts a heat pipe network having heat pipe matrices 204 thermally coupled by a shared spreader heat pipe element 212 in accordance with embodiments of the present disclosure. In this example, the first 204a and second 204b heat pipe matrices are disposed on a common plane, and can be incorporated into a common radiator element 108. Embodiments of the present disclosure can thus be scaled by providing multiple instances of identical or similar heat pipe matrices 204 thermally coupled to one another by a jumper heat pipe 204 or a shared spreader heat pipe element 212. Moreover, although examples having two heat pipe matrices 204 are illustrated, any number of heat pipe matrices 204 as disclosed herein can be thermally coupled to one another and incorporated into the same or different radiator elements 108.

Figure 16:
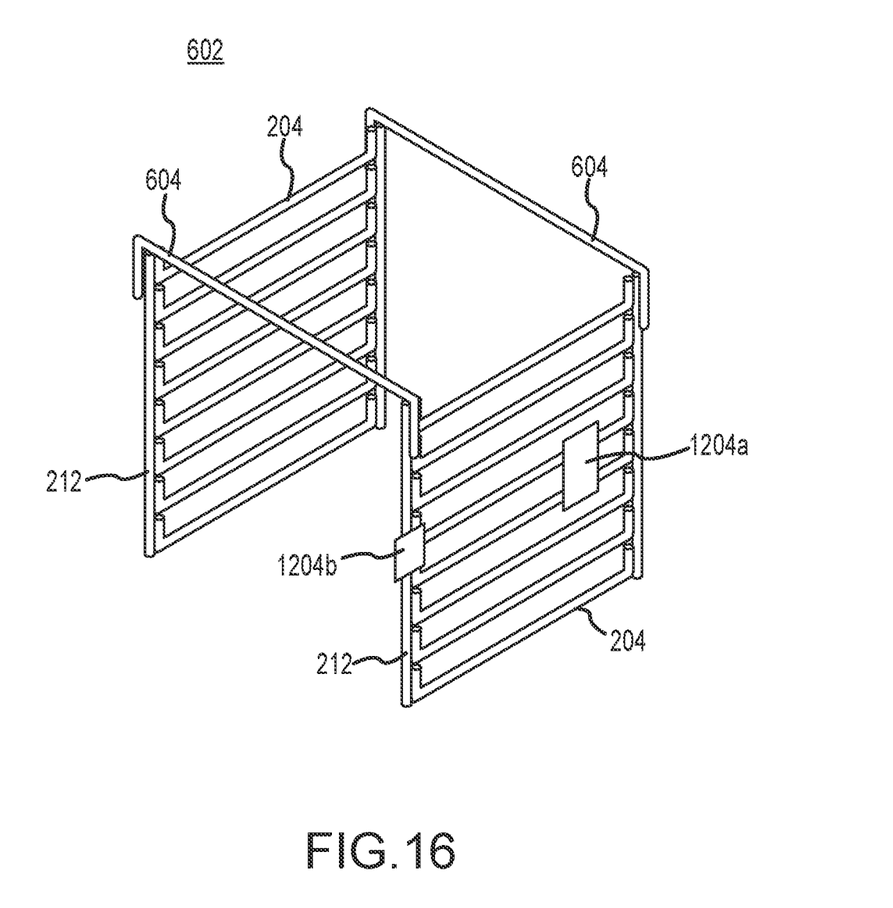
FIG. 16 depicts heat pipe matrices thermally coupled by a jumper heat pipe and incorporating heat spreader elements in accordance with other embodiments of the present disclosure.

FIG. 16 depicts heat pipe matrices 204 thermally coupled by jumper heat pipes 604 in accordance with other embodiments of the present disclosure. In this embodiment, high conductance heat spreader elements 1204 are provided. More particularly, a first high conductance heat spreader element 1204a is provided that thermally couples different lateral heat pipes 208 to one another, and a second high conductance heat spreader element 1204b is provided that thermally couples one or more lateral heat pipes 208 to a spreader heat pipe element 212. In accordance with embodiments of the present disclosure, a high conductance heat spreader 1204 can increase radiator 108 efficiency by increasing the overall conductive coupling between different heat pipes. In addition, a heat spreader element 1204 can function as a mounting point for one or more spacecraft 104 components. A heat spreader element 1204 can be constructed of a vapor chamber, an encapsulated annealed pyrolytic graphite, a high conductance metallic plate, or other thermally conductive material or assembly. Although shown in a heat pipe network 602 having two heat pipe matrices 204, other configurations and combinations are possible.

As can be appreciated by one of skill in the art after consideration of the present disclosure, various embodiments disclosed herein can be combined with one another to provide additional thermal system 106 configurations. Moreover, although various embodiments discuss disposing heat pipe matrices 204 on the same or different planes, it should be appreciated that heat pipe matrices 204 in accordance with embodiments of the present disclosure can extend across multiple planes, and/or can follow curved surfaces, including but not limited to curved platform 104 exterior surfaces, and/or curved radiator faceplates 308. As can also be appreciated by one of skill in the art after consideration of the present disclosure, heat pipe elements 208, 212, 604 can be provided as extrusions, and/or formed from assemblies. Moreover, the heat pipe elements 28, 212, 604 can include internal surface features, such as but not limited to a selected surface roughness, longitudinal channels, wicking materials, hydrophobic coatings or surface treatments, and the like. In addition, the pipe matrices 204 in accordance with embodiments of the present disclosure can incorporated into radiator elements 108 of the various configurations and types.

Figure 17:
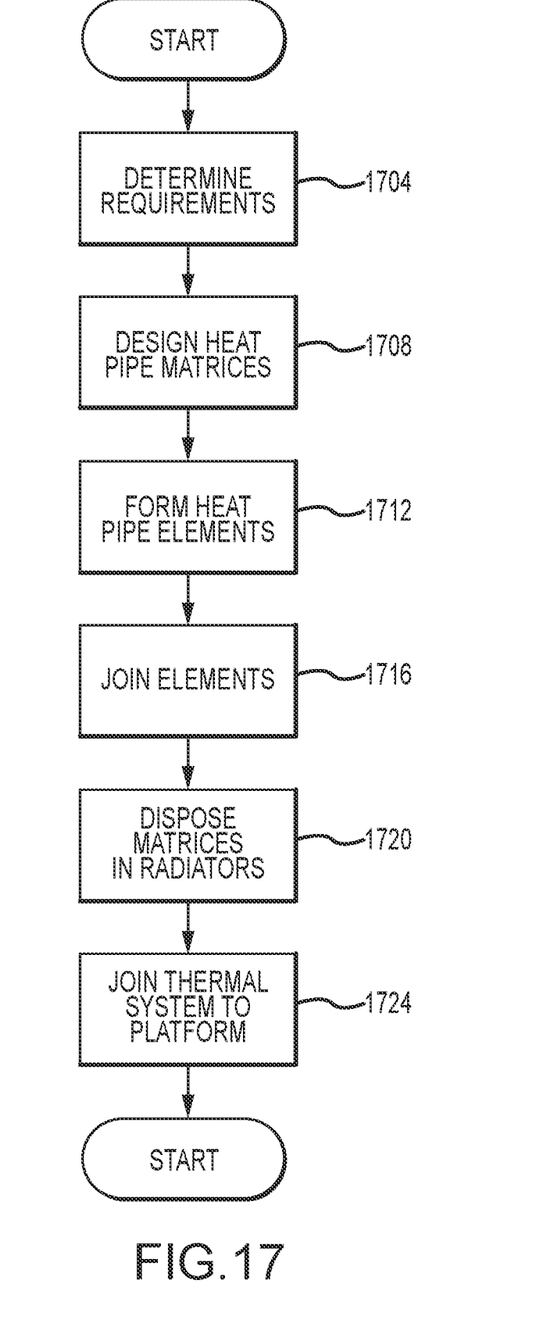
FIG. 17 is a flowchart depicting aspects of a method for providing a thermal system incorporating a heat pipe matrix in accordance with embodiments of the present disclosure.

With reference now to FIG. 17, aspects of methods for providing thermal systems 106 incorporating one or more radiator elements or panels 108 that include one or more heat pipe matrices 204 in accordance with embodiments of the present disclosure are illustrated. Initially, at step 1704, the requirements of the thermal system 106 are determined. Such requirements can include heat dissipation requirements, expected thermal loads, platform 104 related constraints, and the like. At step 1708, the heat pipe matrix or matrices 204 to be included in the thermal system 106 are designed. The elements of the heat pipe matrix or matrices 204 are then formed (step 1712). Forming the elements can include bending, extruding, or otherwise forming the various heat pipe elements 208, 212, and/or 604 that will be included in the heat pipe matrix or matrices 204. The individual elements 208, 212, and/or 604 are then joined to one another, to form a heat pipe matrix or matrices 204 (step 1716). Joining the elements can include placing them in contact with one another along thermal contact regions or areas 224 and/or 624. Joining elements can further include bonding, adhering, welding, or otherwise fixing them to one another. Each heat pipe matrix 204 can then be disposed within an associated radiator 108 (step 1720). Disposing a heat pipe matrix 204 within the radiator 108 can include placing it amongst core 312 components of the radiator 108, and between opposing faceplates 308 of the radiator 108. The completed thermal system 106 can then be joined to a platform 104 (step 1724). Once the platform 104 is otherwise complete, the platform 104 can be operationally deployed.

Heat pipe matrix 204 configurations as described herein include heat pipe elements 208, 212, and/or 604 that are configured so as to interface with one another along parallel thermal contact areas or sections 224 and/or 624. As can be appreciated by one of skill in the art after consideration of the present disclosure, heat pipe matrices 204 as described herein therefore provide increased thermal contact areas 224 and 624 as compared to alternate configurations in which heat pipe elements cross one another rather than extend parallel to one another for at least some distance. In addition, embodiments of the present disclosure can provide for simplified heat pipe elements configurations individually, and as part of a heat pipe matrix 204 including those elements, simplifying manufacturing and reducing costs.

The foregoing description has been presented for purposes of illustration and description. Further, the description is not intended to limit the disclosed systems and methods to the forms disclosed herein. Consequently, variations and modifications commensurate with the above teachings, within the skill or knowledge of the relevant art, are within the scope of the present disclosure. The embodiments described hereinabove are further intended to explain the best mode presently known of practicing the disclosed systems and methods, and to enable others skilled in the art to utilize the disclosed systems and methods in such or in other embodiments and with various modifications required by the particular application or use. It is intended that the appended claims be construed to include alternative embodiments to the extent permitted by the prior art.

What is claimed is:

1. A thermal system, comprising:
   a first radiator element, including:
      first and second faceplates; and
      a core disposed between the first and second faceplates; and
   a first heat pipe matrix, including:
      a first spreader heat pipe element; and
      a first plurality of lateral heat pipe elements,
      wherein a first thermal contact area of a first lateral heat pipe element included in the first plurality of lateral heat pipe elements is thermally coupled to a first thermal contact segment of the first spreader heat pipe element,
      wherein a first thermal contact area of a second lateral heat pipe element included in the first plurality of lateral heat pipe elements is thermally coupled to a second thermal contact segment of the first spreader heat pipe element,
      wherein the first spreader heat pipe element is a serpentine element,
      wherein the first thermal contact segment of the first spreader heat pipe element is connected to the second thermal contact segment of the first spreader heat pipe element by at least a first bend segment of the first spreader heat pipe element, and
      wherein the first and second thermal contact segments of the first spreader heat pipe element, the first bend segment of the first spreader heat pipe element, the first thermal contact area of the first lateral heat pipe element, and the first thermal contact area of the second lateral heat pipe element are disposed between the first and second faceplates.

2. The thermal system of claim 1, wherein the lateral heat pipe elements in the first plurality of lateral heat pipe elements are parallel to one another.

3. The thermal system of claim 1, further comprising:
   a second spreader heat pipe element,
   wherein the first and second lateral heat pipe elements each include a center section and a first end segment,
   wherein the first thermal contact area of the first lateral heat pipe element is located in the center section of the first lateral heat pipe element,
   wherein the first end segment of the first lateral heat pipe element is parallel to and in thermal contact with a first portion of the second spreader heat pipe element,
   wherein the first thermal contact area of the second lateral heat pipe element is located in the center section of the second lateral heat pipe element, and
   wherein the at first end segment of the second lateral heat pipe element is parallel to and in thermal contact with a second portion of the second spreader heat pipe element.

4. The thermal system of claim 3, further comprising:
   a third spreader heat pipe element,
   wherein the lateral heat pipe elements in the first plurality of lateral heat pipe elements each include a second end segment, wherein the first end segment of each lateral heat pipe element in the first plurality of lateral heat pipe elements is parallel to and in thermal contact with a portion of the first spreader heat pipe element, wherein the second end segment of the first lateral heat pipe element included in the first plurality of lateral heat pipe elements is parallel to and in thermal contact with the third spreader heat pipe element, and wherein the second end segment of the second lateral heat pipe element included in the first plurality of lateral heat pipe elements is parallel to and in thermal contact with the third spreader heat pipe element.

5. The thermal system of claim 4, further comprising a third spreader heat pipe element, wherein the third spreader heat pipe element is a serpentine element.

6. The thermal system of claim 1, further comprising:
   a second spreader heat pipe element,
   wherein a second thermal contact area of the first lateral heat pipe element included in the first plurality of lateral heat pipe elements is thermally coupled to a first thermal contact segment of the second spreader heat pipe element,
   wherein a second thermal contact area of the second lateral heat pipe element included in the first plurality of lateral heat pipe elements is thermally coupled to a second thermal contact segment of the second spreader heat pipe element,
   wherein the second spreader heat pipe element is a serpentine element, and
   wherein the first thermal contact segment of the second spreader heat pipe element is connected to the second thermal contact segment of the second spreader heat pipe element by at least a first bend segment of the second spreader heat pipe element.

7. The thermal system of claim 6, further comprising:
   third and fourth spreader heat pipe elements, wherein the third and fourth spreader heat pipe elements are straight elements, wherein the lateral heat pipe elements in the first plurality of lateral heat pipe elements are U-shaped heat pipe elements that each have a first end segment thermally connected to the third spreader heat pipe element, and a second end segment thermally connected to the fourth spreader heat pipe element.

8. The thermal system of claim 1, further comprising:
a second spreader heat pipe element; and
a second plurality of lateral heat pipe elements,
   wherein a first thermal contact area of a first lateral heat pipe included in the second plurality of lateral heat pipe elements is thermally coupled to a first thermal contact segment of the second spreader heat pipe element,
   wherein a first thermal contact area of a second lateral heat pipe included in the second plurality of the lateral heat pipe elements is thermally coupled to a second thermal contact segment of the second spreader heat pipe element,
   wherein the second spreader heat pipe element is a serpentine element,
   wherein the first thermal contact segment of the second spreader heat pipe element is connected to the second thermal contact segment of the second spreader heat pipe element by at least a first bend segment of the second spreader heat pipe element, and
   wherein the lateral heat pipe elements included in the first plurality of lateral heat pipe elements are interleaved with the lateral heat pipe elements included in the second plurality of lateral heat pipe elements.

9. The thermal system of claim 8, wherein the first thermal contact segment of the first spreader heat pipe element, the first bend segment of the first spreader heat pipe element, and the second thermal contact segment of the first spreader heat pipe element are intersected by a first plane, and
   wherein the first thermal contact segment of the second spreader heat pipe element, the first bend segment of the second spreader heat pipe element, and the second thermal contact segment of the second spreader heat pipe element are intersected by the first plane.

10. The thermal system of claim 1, further comprising;
a second heat pipe matrix, including:
   a second spreader heat pipe element; and
   a second plurality of lateral heat pipe elements, wherein a first thermal contact area of a first lateral heat pipe element included in the second plurality of lateral heat pipe elements is thermally coupled to a first thermal contact segment of the second spreader heat pipe element.

11. The thermal system of claim 10, wherein the first and second heat pipe matrices are thermally coupled to one another by a first jumper heat pipe, wherein the first jumper heat pipe includes a first end section that is thermally coupled to the first spreader heat pipe element, and wherein the first jumper heat pipe includes a second end section that is thermally coupled to the second spreader heat pipe element.

12. The thermal system of claim 10, wherein at least portions of the second heat pipe matrix are disposed between the first and second faceplates of the first radiator element.

13. The thermal system of claim 10, wherein the first and second heat pipe matrices are disposed in different planes.

14. The thermal system of claim 1, wherein the at least a first bend segment of the first spreader heat pipe element is not parallel to the first and second thermal contact segments of the first spreader heat pipe element.

15. The thermal system of claim 1, wherein the first thermal contact segment of the first spreader heat pipe element, the first bend segment of the first spreader heat pipe element, and the second thermal contact segment of the first spreader heat pipe element are intersected by a first plane.

16. A heat pipe matrix, including:
a first spreader heat pipe element;
a second spreader heat pipe element;
a first plurality of lateral heat pipe elements; and
a second plurality of lateral heat pipe elements,
   wherein the lateral heat pipe elements in the first plurality of lateral heat pipe elements are L-shaped,
   wherein a first end segment of a first lateral heat pipe element included in the first plurality of lateral heat pipe elements is thermally coupled and parallel to a first portion of the first spreader heat pipe element,
   wherein the first end segment of the first lateral heat pipe element included in the first plurality of lateral heat pipe elements extends in a first direction,
   wherein the lateral heat pipe elements in the second plurality of lateral heat pipe elements are L-shaped,
   wherein a first end segment of a first lateral heat pipe element included in the second plurality of lateral heat pipe elements is thermally coupled and parallel to a first portion of the second spreader heat pipe element,
   wherein the first end segment of the first lateral heat pipe element included in the second plurality of lateral heat pipe elements extends in a second direction,
   wherein the first direction is opposite to the second direction,
   wherein a second end segment of the first lateral heat pipe element included in the first plurality of lateral heat pipe elements is proximate to the first end segment of the first lateral heat pipe element included in the second plurality of lateral heat pipe elements,
   wherein the first lateral heat pipe element included in the first plurality of lateral heat pipe elements is not in contact with any lateral heat pipe element included in the second plurality of lateral heat pipe elements,
   wherein a second end segment of the first lateral heat pipe element included in the second plurality of lateral heat pipe elements is proximate to the first end segment of the first lateral heat pipe element included in the first plurality of lateral heat pipe elements, and
   wherein the first lateral heat pipe element included in the second plurality of lateral heat pipe elements is not in contact with any lateral heat pipe elements included in the first plurality of lateral heat pipe elements.

17. A thermal system, comprising:
a first radiator element, including:
   first and second faceplates; and
   a core disposed between the first and second faceplates;
a first heat pipe matrix, including:
   at least a first spreader heat pipe element; and
   at least a first plurality of lateral heat pipe elements,
      wherein a length of each lateral heat pipe element in the first plurality of lateral heat pipe elements is thermally coupled to the at least a first spreader heat pipe element along at least a first segment that is parallel to at least a portion of the first spreader heat pipe element,
      wherein at least portions of the first heat pipe matrix are disposed between the first and second faceplates,
      wherein the at least a first spreader heat pipe element is a serpentine element with a first thermal contact segment that is in contact with a first portion of a length of a first lateral heat pipe element in the first plurality of lateral heat pipe elements, a second thermal contact segment that is in contact with a first portion of a length of a second lateral heat pipe element in the first plurality of lateral heat pipe elements, and a bend segment that connects the first thermal contact segment to the second thermal contact segment;
a second spreader heat pipe element, wherein the second spreader heat pipe element is a serpentine element with a first thermal contact segment that is in contact with a second portion of the length of the first lateral heat pipe element in the first plurality of lateral heat pipe elements, a second thermal contact segment that is in contact with a second portion of the length of the second lateral heat pipe element in the first plurality of lateral heat pipe elements, and a bend segment that connects the first thermal contact segment to the second thermal contact segment; and third and fourth spreader heat pipe elements, wherein the third and fourth spreader heat pipe elements are straight elements, and wherein the lateral heat pipe elements in the first plurality of lateral heat pipe elements are U-shaped heat pipe elements that each have a first end segment thermally connected to the third spreader heat pipe element and a second end segment thermally connected to the fourth spreader heat pipe element.

* * * * *